Figure 1:
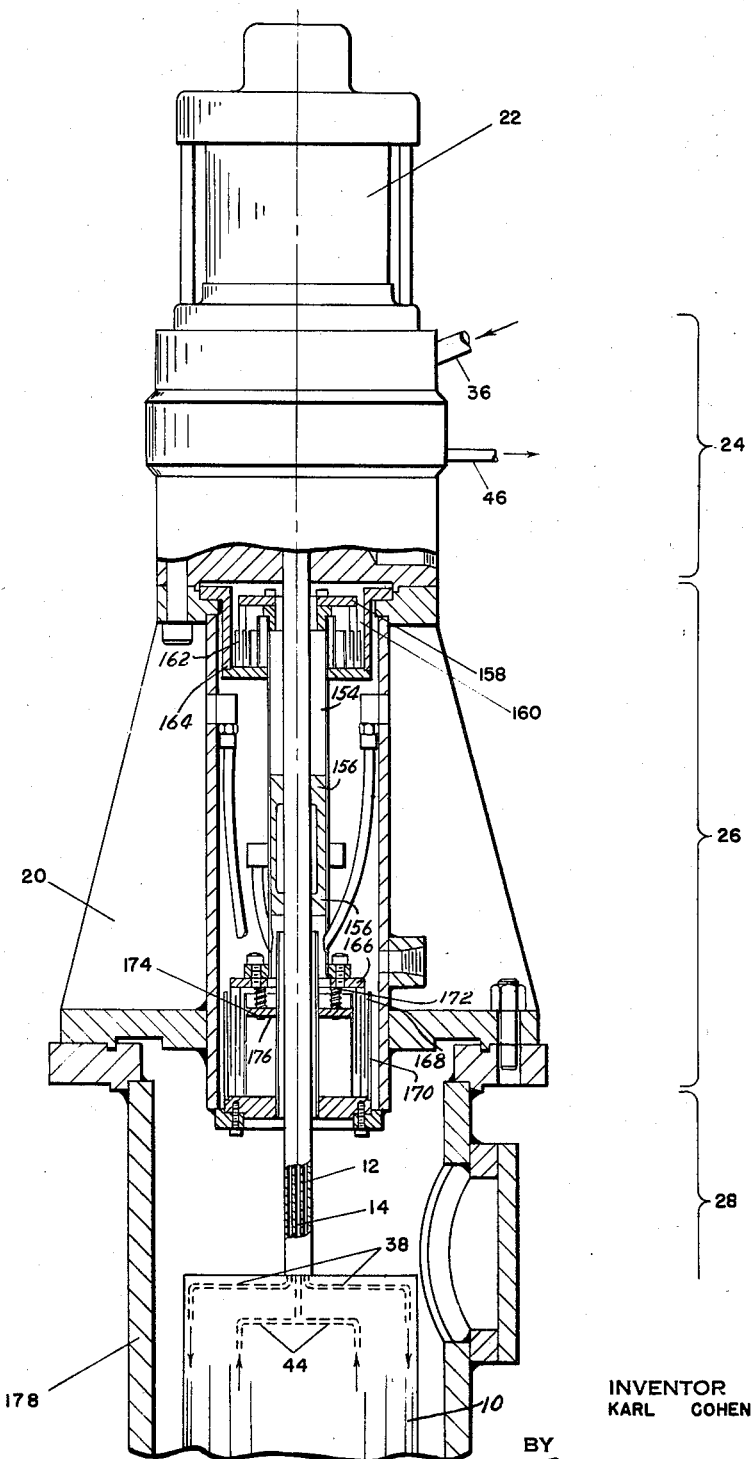

May 10, 1960 K. COHEN 2,936,110
METHOD OF CENTRIFUGE OPERATION
Filed Jan. 31, 1945 6 Sheets-Sheet 1

INVENTOR
KARL COHEN
BY
*Robert A. ...*
ATTORNEY

INVENTOR
KARL COHEN
BY
ATTORNEY

May 10, 1960  K. COHEN  2,936,110
METHOD OF CENTRIFUGE OPERATION
Filed Jan. 31, 1945  6 Sheets-Sheet 3

INVENTOR
Karl Cohen
BY
*Robert A. Cavender*
ATTORNEY

May 10, 1960 K. COHEN 2,936,110
METHOD OF CENTRIFUGE OPERATION
Filed Jan. 31, 1945 6 Sheets-Sheet 5

INVENTOR
KARL COHEN
BY
*Robert A. [signature]*
ATTORNEY

United States Patent Office 2,936,110
Patented May 10, 1960

2,936,110
METHOD OF CENTRIFUGE OPERATION

Karl Cohen, New York, N.Y., assignor to the United States of America as represented by the United States Atomic Energy Commission Application January 31, 1945, Serial No. 575,533

14 Claims. (Cl. 233—13)

This invention relates to centrifugal separation and more particularly to a novel method for improving the efficiency of a tubular high-speed centrifuge in separating fluid mixtures. The method of the present invention is particularly well adapted for use in the continuous separation of gaseous mixtures, such as, for example, isotopic gaseous mixtures e.g. the isotopes oxygen, nitrogen, chlorine, hydrogen or neon and will be described as applied to this relatively complex problem. However, as the description proceeds, it will become apparent that the method of the invention may also be applied with advantage to the relatively simpler problem of separating non-gaseous mixtures such as liquid dispersions and suspensions.

It is now well-established that most of the chemical elements as they occur naturally consist of mixtures of different species called isotopes, and that the isotopes of an element possess substantially identical chemical properties but differ from one another in atomic mass. Many of these isotopes possess interesting and useful properties, and in recent years there has been an increasing interest in methods for effecting a separation of such isotopes either by separating the isotopes of an element directly or by forming a compound of the element and separating the different isotopic species of the compound. Because of the chemical identity of the isotopes and the relatively small differences in their atomic masses, the problem of separation is an exceedingly difficult one.

Various methods of separation have been considered and examined. Since difference in mass is one of the most significant differences between the isotopes of an element, centrifugal separation in a continuous high-speed centrifuge is a method of separation that may, in theory, be used with advantage. However, when an attempt is made to effect a separation of the components of the gaseous mixtures by centrifugal force, a number of practical problems are encountered.

According to one previous proposal, an isotopic mixture in the form of a volatile liquid is placed in one end of the rotor bowl of a vertically arranged centrifuge, the centrifuge is rotated at high speed and vapor is withdrawn from the centrifuge rotor at a point near its axis of rotation. Since the heavier constituent of the vapor tends to concentrate at the periphery of the centrifuge, the vapor near the axis will be enriched with respect to the lighter constituent. Thus by withdrawing vapor near the axis of the centrifuge, a partial separation of the vapor may be effected and if such a partial separation is repeated a sufficient number of times, it is theoretically possible to obtain substantially complete separation. Such centrifuges are sometimes called "distilling" centrifuges.

In accordance with another proposal, an isotopic gaseous mixture is fed continuously into one end of the rotor of a centrifuge, either at the axis or at the periphery of the centrifuge bowl and two fractions of the mixture are withdrawn from the other end of the centrifuge bowl, one near the axis and the other near the periphery of the bowl. In this case, the peripheral fraction is enriched with respect to the heavy constituent of the mixture and the axial fraction is enriched with respect to the light constituent.

It should be noted that in both of these proposals there is an appreciable amount of transverse mass flow of the gaseous mixture which tends to cause undesired mixing of the components of the mixture. In the second case, for example, if the gas enters at the axis of the centrifuge, a part of the gas flows radially outward to the periphery to be withdrawn from the periphery at the other end of the centrifuge or, if gas is admitted at the periphery of the centrifuge bowl, a fraction of the gas flows radially inward to the axis to be withdrawn near the other end of the axis of the centrifuge bowl. Gas that flows radially outward in the rotor of a centrifuge is compressed adiabatically and thereby heated and gas that flows radially inward toward the axis of the rotor expands adiabatically and is thereby cooled. Thus transverse mass flow of the gaseous mixture not only produces mixing in itself but also produces thermal effects that tend to cause mixing of the gas within the centrifuge, thereby reducing the efficiency of separation. Since the amount of separation that can be obtained in a single pass through the centrifuge is under the most favorable circumstances very small, it is important that the conditions of operation of the centrifuge be such as to give a relatively high efficiency.

The "distilling" centrifuge referred to above is open to a still further objection in that it is not possible with this centrifuge to establish a definite predetermined mass flow pattern. In the operation of this centrifuge a certain amount of desirable countercurrent flow may be obtained by countercurrent movement of vapor and condensate but this flow is uncontrolled and the direction and amount of countercurrent flow cannot be conveniently determined and evaluated. Furthermore this type of centrifuge is not suitable for fully continuous operation.

In view of the relatively small separation obtained in a single pass, it is desirable that a number of centrifuges be interconnected in a so-called "cascade" in such manner that the heavy fractions of the mixture move toward the bottom of the cascade and the light fractions toward the top of the cascade. In such a cascade, a number of centrifuges may be connected in parallel to form a group or stage of the cascade and a number of stages may be connected in series to effect the desired separation. As the fractions become more concentrated, the quantity of material being processed diminishes and therefore the stages handling the more concentrated product do not require as many centrifuges as the stages handling the less concentrated product. A cascade to be used in recovering the light fraction of a gaseous mixture may be thought of as a triangle, the base of the triangle representing the base stage of the cascade where the unseparated material is introduced, and the apex of the triangle representing the top of the cascade where the pure product is withdrawn. The shape of the triangle will depend upon the efficiency of the individual centrifuges forming the cascade. Thus if the individual centrifuges are relatively poor separators, a large number of stages will be required relative to the number of centrifuges in the base stage of the cascade, i.e. the triangle diagrammatically representing the cascade will have a base that is narrow with respect to its altitude. Contrariwise, if the individual centrifuges are highly efficient separators, a smaller number of stages may be used and the triangle representing the arrangement of the centrifuges in the cascade will have a base that is relatively wide with respect to its altitude.

In separating difficultly separable gaseous mixtures such as, for example, the isotopic species of uranium hexafluoride, a very large number of centrifuges is required. It is therefore a matter of considerable importance in such a case that the individual centrifuges be so constructed and operated that they may be arranged in a cascade to produce a maximum amount of pure product, or, stated in a reverse sense, it is desirable that the number of centrifuges required to produce a given quantity of product of a given concentration be minimized in order to reduce the initial cost and power consumption of the cascade. Since a very large number of centrifuges are required even under the most favorable circumstances, a relatively slight improvement in the operation of the individual centrifuges results in a substantial overall saving.

The operation of such a cascade and the maintenance of proper flows in the various stages and between the stages is a complicated problem and it is therefore desirable that the individual machines be arranged in independently controllable groups which may be cut into or out of the cascade for purposes of repairs and reconditioning without unduly interfering with the operation of the rest of the cascade. In general it may be said that the broad-based cascade may be more easily subdivided in this manner.

It is an object of the present invention to provide an improved centrifuge unit for a fluid-separating cascade.

It is another object of the invention to provide a method of operating a centrifugal separator to produce more efficient separation of the components of a fluid mixture.

It is still another object of the invention to provide a method of centrifuge operation which will reduce the number of machines required to produce a given quantity of separated product.

It is a further object of the invention to provide a method of centrifuge operation which makes it possible to use a cascade having a relatively small number of stages in series.

It is still another object of the invention to provide a method of centrifuge operation which permits reduction in the diameter of the shaft of the centrifuge.

It is a still further object of the invention to provide a method of centrifuge operation which gives a greater degree of operative flexibility, especially when such centrifuges are arranged in a cascade.

Other objects of the invention will be in part obvious and in part pointed out hereinafter.

In one of its broader aspects, the present invention comprises a method of separating components of a fluid mixture by passing the mixture through a centrifuge in such manner as to establish and maintain a well-defined countercurrent flow pattern characterized by the fact that the fluid mixture flows through the centrifuge in two countercurrent axial streams and that transverse mass flow of the fluid mixture is substantially eliminated. In accordance with a preferred pattern that has been shown to produce highly efficient separation, especially in the case of gaseous mixtures, separate portions of the mixture are caused to flow through the centrifuge rotor in two thin annular countercurrent streams, one stream being located at or near the periphery of the centrifuge bowl and the other stream being located between the peripheral stream and the axis of rotation of the centrifuge. It has been found that when the centrifuge is rotated at high speed the centrifugal field causes the flow pattern to be maintained in such a way that, contrary to what might be expected, there is substantially no intermixing of the two spaced streams and that the flow between the streams is limited to diffusive flow under the influence of the centrifugal field. The lighter component of the mixture tends to diffuse from the peripheral stream to the inner stream and the heavy constituent tends to diffuse from the inner stream to the peripheral stream.

The use of such a countercurrent flow pattern results in a number of important advantages over the conventional flow-through centrifuge. By using countercurrent flow in accordance with the method of the present invention, a greater increase in concentration may be obtained per stage and therefore when such centrifuges are arranged in a cascade, fewer centrifuge stages are required in series. As pointed out above, this permits the use of a cascade having a relatively broad base and such a cascade can be more easily subdivided into independently controllable units to facilitate operation of the cascade. Furthermore, the increased separation obtained per centrifuge results in a substantial reduction in the total number of centrifuges required to produce a given quantity of product having a given concentration of the desired constituent. A still further advantage of the countercurrent centrifuge is that the total flow of material through the centrifuge may be reduced, and since the fluid mixture is normally introduced into the centrifuge rotor or bowl through the shafts which support the rotor, smaller inlet and outlet conduits may be used. Thus the supporting shafts may be made smaller when countercurrent flow is used, thereby decreasing the weight of the centrifuge and improving its operation.

It is evident that in order to attain the advantages of countercurrent flow as described above, intermixing of the two countercurrently flowing streams must be substantially prevented, and the maintenace of a flow pattern such that the countercurrent streams are spaced a predetermined distance from one another is an important feature of the present invention. As pointed out above, in accordance with one pattern that has been found to give satisfactory results, separate fractions of the mixture are caused to flow through the centrifuge in two thin annular or cylindrical streams, one stream being at the periphery of the centrifuge and the other stream being radially spaced from both the axis and periphery of the centrifuge. The precise spacing of the two streams depends, to some extent, upon the temperature gradients within the centrifuge. It has been found that for isothermal operation the inner stream should be located at a radial distance from the rotor axis approximately 53% of the radial distance from the axis to the periphery of the rotor. However, if there is a radial temperature gradient within the centrifuge, the optimum position of the inner stream may vary between 40% and 60% of the radius of the centrifuge. Thus, if there is a temperature gradient that increases from the axis to the periphery of the centrifuge, the optimum position of the inner stream may be as little as 40 to 43% of the radius, whereas if there is a temperature gradient that increases from the periphery to the axis of the centrifuge, the optimum position of the inner stream may be as much as 57 to 60% of the radius.

In accordance with an alternative flow pattern that may be used, one portion of the gas is caused to flow through the centrifuge in a central cylindrical stream filling the entire axial portion of the centrifuge, and a second portion of the gas is caused to flow countercurrent to the central stream in a thin annular stream located at the periphery of the centrifuge. Where this second flow pattern is used, the radius of the inner central stream is desirably made about 75% of the radius of the centrifuge, assuming that there is no substantial radial temperature gradient within the centrifuge.

It should be noted that with both of the above flow patterns, the two streams are spaced a predetermined distance apart and there is a relatively quiescent body of gas between the streams. The light component under the influence of the centrifugal field diffuses from the outer stream through the quiescent body of gas to the inner stream, and the heavy component from the inner stream through the quiescent gas to the outer stream. However, the nature of the centrifugal field is such that there is little, if any, mass movement of gas from one stream to the other.

Figure 2:
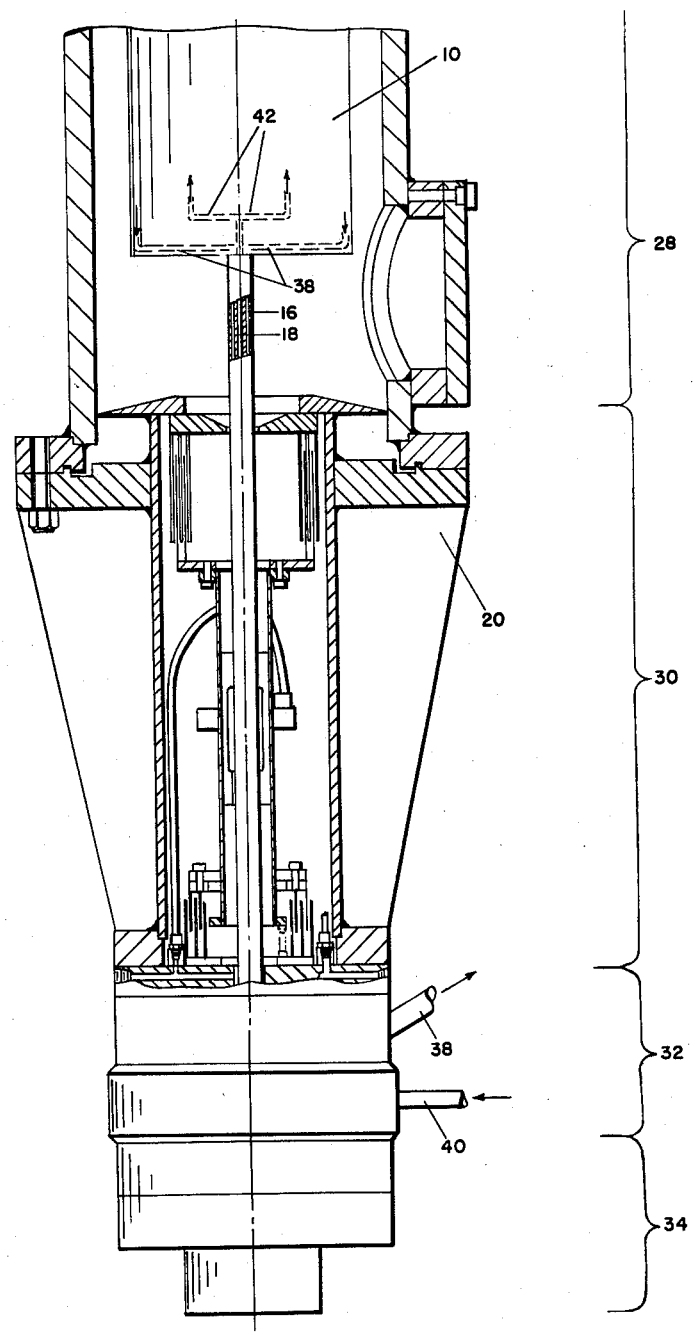
Figure 5:
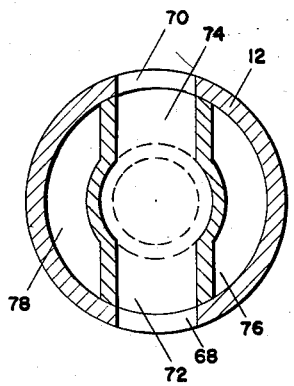
Figure 4:
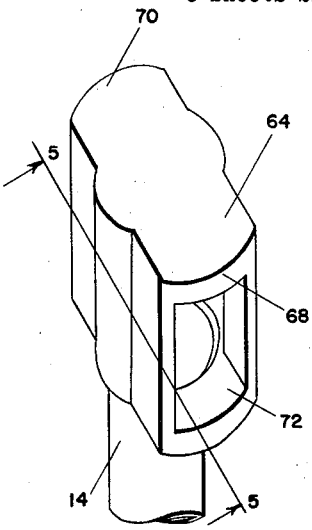
Figure 3:
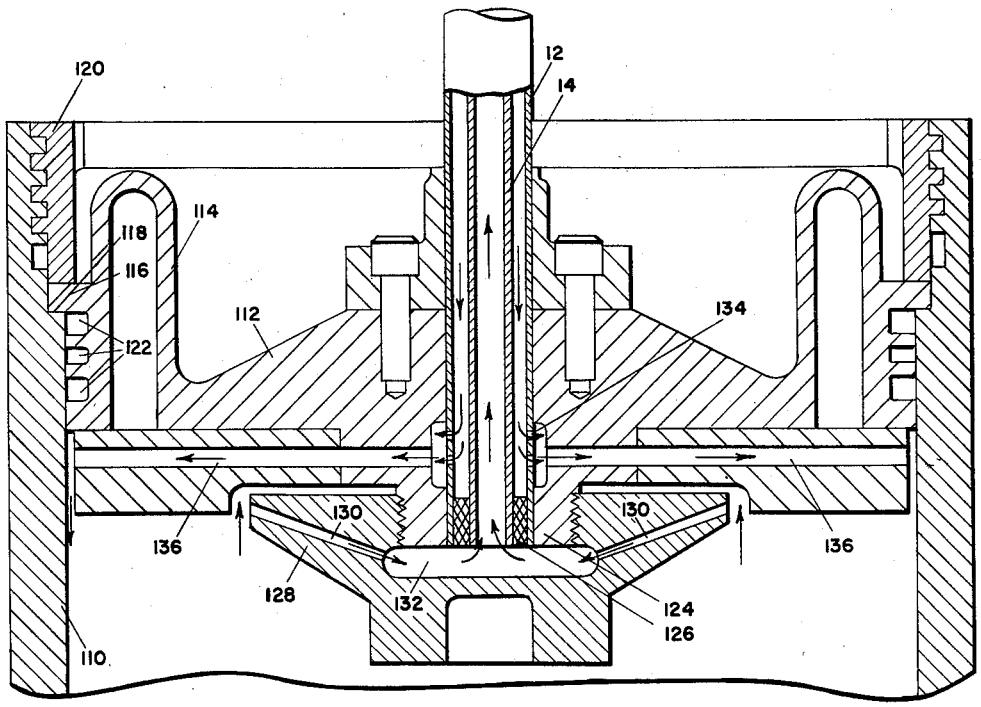
Figure 6:
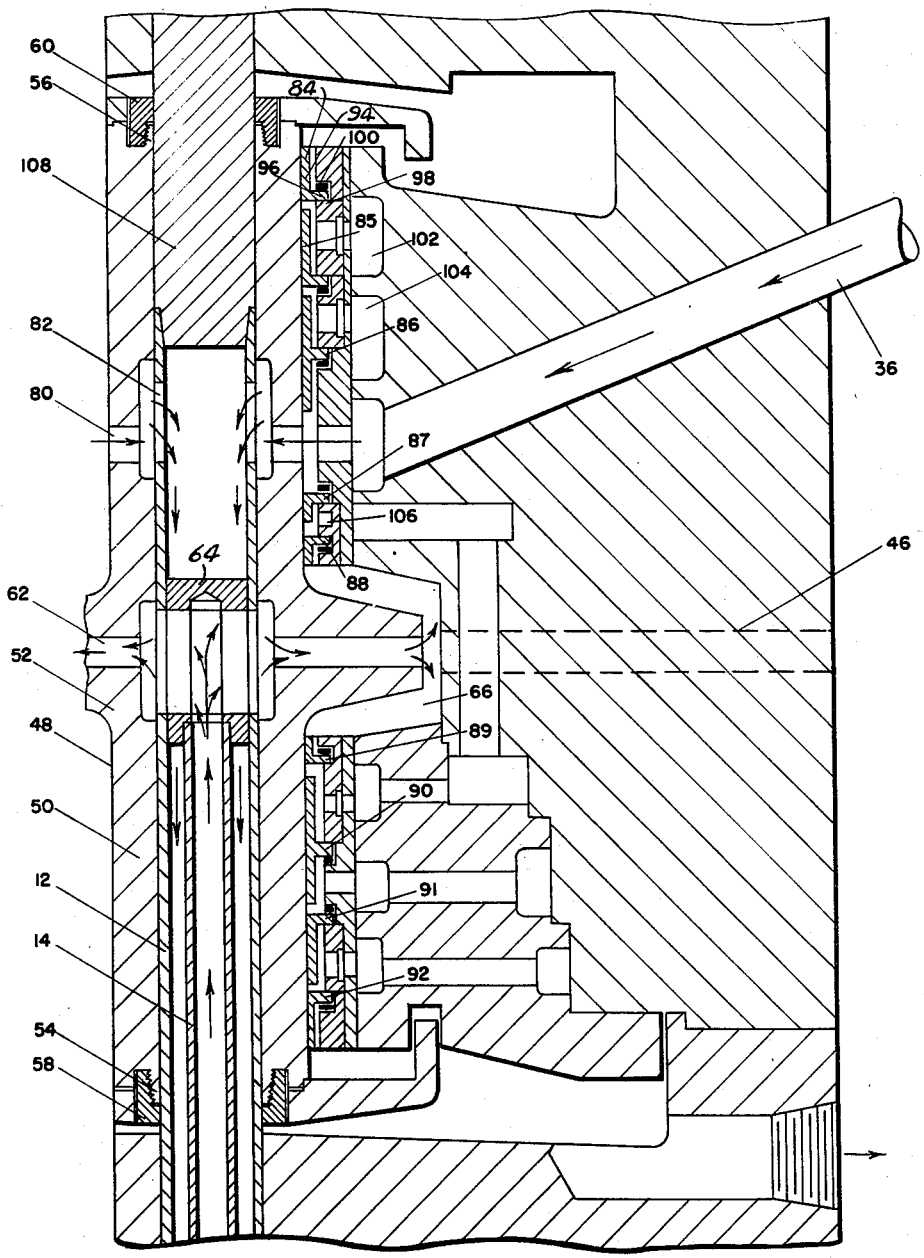
Figure 7:
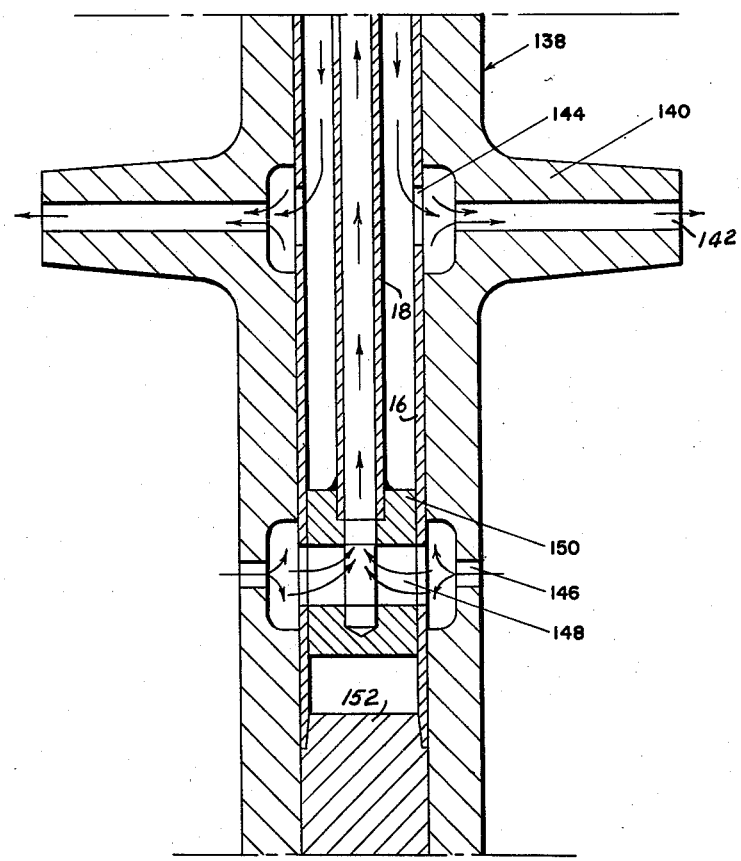
Figure 8:
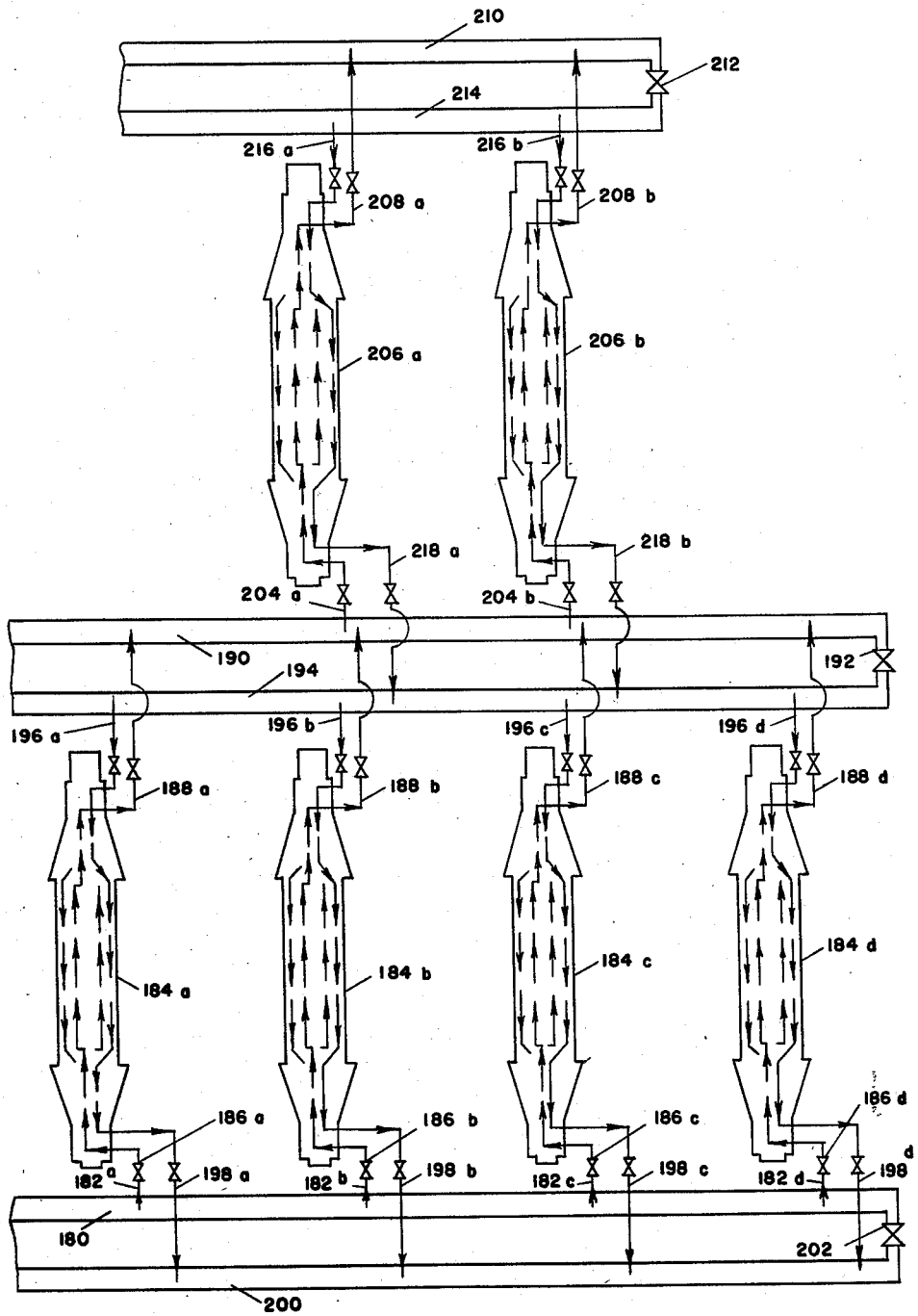

A centrifuge embodying the present invention and capable of establishing and maintaining the first of the above-mentioned countercurrent flow patterns is illustratively shown in the accompanying drawings wherein Figure 1 is an elevation view partly in section of the top portion of the centrifuge. Figure 2 is an elevation view partly in section of the bottom portion of the centrifuge. Figure 3 is an enlarged axial section of one end of the centrifuge rotor showing the arrangement of the inlet and outlet passages. Figure 4 is a perspective view of a transposition piece used to conduct gas from the inner shaft through the space between the inner and outer shaft. Figure 5 is a horizontal section taken along the line 5—5 of Figure 4 and showing further details of the transposition piece. Figure 6 is an enlarged fragmentary axial sectional view of the upper port section of the centrifuge showing the shaft port and seal construction. Figure 7 is an axial sectional view of the lower port section of the centrifuge, and Figure 8 is a diagram indicating how countercurrent centrifuges may be arranged in a cascade.

The centrifuge shown in the drawings is particularly well adapted for use in connection with a valuable and highly corrosive gas such as uranium hexafluoride. As the description proceeds, it will be apparent that the construction of the centrifuge may be simplified where the material being handled is non-corrosive and is of relatively slight value.

Referring to the drawings and more particularly to Figures 1 and 2, the centrifuge there shown comprises, in general, a rotor bowl 10 which is supported at its top by an outer hollow shaft 12 and inner concentric hollow shaft 14 and is supported at the bottom by an outer hollow shaft 16 and a concentric inner hollow shaft 18. The shafts are in turn supported in a stationary housing 20 in a manner presently to be described. The rotor 10 is rotated at high speed by a motor 22 mounted at the top of the machine and connected to rotor 10 through shafts 12 and 14. The stationary portions of the machine include, in addition to the motor 22, an upper port section 24, an upper damper section 26, a rotor casing 28, a lower damper section 30, a lower port section 32 and a thrust bearing section 34. The thrust bearing may be of conventional construction and is not shown in detail in the drawings.

The flow of gas through the centrifuge is generally as follows: A portion of the gaseous mixture enters the upper port section 24 through a conduit 36 and flows downwardly through the space between shafts 12 and 14 to the top of the rotor 10. When the gas reaches the top of the rotor, it is conducted to the periphery of the rotor through passages 38 and flows downwardly through the rotor in a thin annular peripheral stream. At the bottom of the rotor 10 (see Figure 2) the peripheral stream of gas is conducted through passages 38 to the center of the rotor and passes downwardly through the space between shafts 16 and 18 to the lower port section 32 and thence out of the machine through a conduit 39.

A second portion of the gaseous mixture enters the lower port section 32 through a conduit 40 and flows upwardly through inner hollow shaft 18 to the bottom of the rotor 10 where it is conducted by passages 42 to a point about midway between the axis and periphery of the rotor 10. Upon leaving the passages 42, the second portion of gas flows upwardly in a thin annular stream to the top of the rotor and is conducted through passages 44 to the upper inner hollow shaft 14. The second portion of gas then flows up through shaft 14 and leaves the machine through a conduit 46 in the upper port section 24 of the machine. Thus with the construction shown, a flow pattern is established within the rotor 10 comprising an outer downwardly flowing peripheral stream and an inner upwardly flowing stream that is spaced a predetermined distance from the outer stream.

The details of the upper port section 24 are best shown in Figure 6. Referring to Figure 6, surrounding the outer shaft 12 there is a pumping element 48 comprising an elongated sleeve 50 and an impeller 52. The sleeve 50 is provided at its ends with the threaded collets 54 and 56 which are forced against the shaft 12 by screws 58 and 60 to fix the sleeve 50 rigidly to the shaft 12. The impeller 52 is provided with the internal radial passages 62, the inner ends of which communicate through a transposition piece 64 with the interior of shaft 14. The construction is such that the pumping element 48 rotates with the shafts 12 and 14 and gas is pumped by impeller 52 from the interior of shaft 14 to a pump discharge space 66.

The construction of the transposition piece 64 is best shown in Figures 4 and 5. As shown in Figure 4, the transposition piece is of elongated shape and has ends 68 and 70 that are shaped to conform with the inner surface of the shaft 12. Gas flowing upwardly through the inner shaft 14 passes to the interior of the transposition piece and then flows radially outward through the passages 72 and 74 of the transposition piece to the impeller passages 62. The shape of the transposition piece 64 is such that it forms with the shaft 12 (see Figure 5) a pair of passages 76 and 78 through which a second portion of the gas may flow without coming into contact with the gas flowing upwardly through inner shaft 14.

Referring again to Figure 6, the gas from discharge space 66 leaves the upper port section through conduit 46. The gas that enters the upper port section 24 through conduit 36 flows through one of a series of ports 80 in the sleeve 50 and then through one of a series of ports 82 in the outer shaft 12 to the interior of the shaft 12. The entering gas then flows downwardly through passages 76 and 78 between the transposition piece 64 and the inner wall of shaft 12 to the space between the shafts 12 and 14. To prevent the gas entering the outer shaft 12 through ports 82 from flowing upwardly, the shaft is connected to a solid rod 108 which extends upwardly and is connected to the rotor of motor 22.

In cases where the process gas being separated is a valuable and highly corrosive gas such as uranium hexafluoride, it is important on the one hand that the gas be prevented from coming into contact with oil or other lubricating agents used in the centrifuge and that it be prevented from escaping to the atmosphere. To attain these objectives, a series of seals, including an inert gas seal, is provided. Surrounding the sleeve 50 there is a series of seal rings of similar construction, 84, 85, 86, 87, 88, 89, 90, 91 and 92. Since these rings are of similar construction only one need be described in detail. Ring 84 comprises a cylindrical portion 94 that is fitted to the outer surface of sleeve 50 with a relatively small clearance, and a radially extending flange 96. The lower surface of flange 96 is urged against a seat 98 by a spring 100. The construction is such that the shaft and seal ring may move radially with respect to the seat 98 and that a reasonably tight seal can be maintained during periods when the shaft may be vibrating radially. The seal rings 85 to 92 are of similar construction except that in certain instances the cylindrical portion of the ring is made longer to increase the gas leakage path.

As a further precaution against undesired contact between the process gas and the centrifuge lubricant, an inert gas, such as, for example, nitrogen is admitted to the space 102 between the seal rings 84 and 85 under such a pressure that there is a continuous small leakage of the inert gas between the ring 84 and sleeve 50 and between the ring 85 and the sleeve 50. Inert gas which leaks past the seal ring 85 flows to a space 104 from which it is withdrawn through a conduit (not shown). In order to prevent contamination of the process gas by the inert gas, the pressure in space 104 is maintained lower than the pressure in conduit 36 and thus there is no danger of leakage of the inert gas into the process gas past the seal ring 86. If any process gas leaks from the conduit 36 to the space 104, it is withdrawn from the space 104 with the inert gas and may be subsequently recovered. The seal ring is made relatively long to increase the leakage path and thus minimize the quantity of process gas leakage into the space 104.

To prevent intermixing of the two process gas fractions, the space 106 between the seals 87 and 88 is maintained at a pressure lower than that in the conduit 36 and also lower than that in the discharge space 66. Thus any leakage that occurs is necessarily from conduit 36 to space 106 and from discharge space 66 to space 106 and there is no danger of admixture of the two portions of the process gas. Gas that leaks into the space 106 is withdrawn from a conduit (not shown) and may be reprocessed. Seals 89 to 92 are similar in construction to seals 84 to 88 and operate in a similar manner.

When the centrifuge shown in the drawings is used for separating an isotopic gaseous mixture, it is desirably operated at a relatively high speed, i.e. 25,000 to 30,000 r.p.m. and there is a tendency for the centrifuge rotor and other rotating parts to vibrate. In order to minimize this tendency towards vibration, an upper damper 26 and lower damper 30 are provided. Referring to Figure 1, and more particularly the upper damper section 26, a sleeve 154 is mounted by means of the journal bearings 156 on the outer shaft 12 of the centrifuge in such manner that the shaft and sleeve are relatively rotatable. At the top of the sleeve 154 there is fixed a ring 158 from which a series of cylindrical damper vanes extend downwardly. The vanes 160 intermesh with a second series of cylindrical vanes 162 that are fixed to the bottom of an oil chamber 164 which is substantially filled with oil. The oil in chamber 164 inhibits radial movement of the vanes 160 and thus tends to reduce vibration of the centrifuge shaft.

Near the bottom of the sleeve 154 there is a ring 166 similar to the ring 158 and having the depending cylindrical vanes 168 fixed thereto. Vanes 168 intermesh with the stationary cylindrical vanes 170 and are immersed in oil in the same manner as vanes 158 and 160. The sleeve 154 and its associated movable parts are supported on a series of springs 172, which are maintained in operative position by a series of pins 174 that extend therethrough. The pins 174 are fixed to the ring 166 and pass down through the springs 172 and through holes in a stationary plate 176 mounted on the innermost of the stationary vanes 170. The pins 174 tend to prevent rotation of the sleeve 154 and its associated parts.

The shafts 12 and 14 extend downwardly through the damper section 26 to the top of rotor 10, the details of which are best shown in Figure 3. Referring to Figure 3, the rotor 10 comprises, in general, a cylindrical wall 110 and a pair of similarly constructed end caps, the upper end cap 112, being shown in Figure 3. Since the rotor rotates at high speed, the diameter of the rotor will increase somewhat due to centrifugal force operating thereon. Furthermore, the rotor must be hermetically sealed at all times. Therefore, the cap 112 is made with an annular gooseneck 114 to provide for expansion of the cap to maintain a tight seal between the cap and rotor wall when the machine is in operation. The gooseneck 114 is provided with an external flange 116 that rests on a shoulder 118 of the wall 110 in such a manner that the shoulder 118 supports the cap 112. The flange 116 is held firmly against the shoulder 118 by an externally threaded ring 120 that is threaded into the inner surface of the top of wall 110. Suitable gaskets 122 are provided between the gooseneck 114 and wall 110 to prevent leakage of gas therebetween. The rotor is preferably assembled with the cap under radial compression so that when the rotor comes up to speed, the outer portions of gooseneck 114 will still bear firmly against the inner surface of wall 110.

The cap 112 is provided with a central downwardly extending bushing 124 and the concentric hollow shafts 12 and 14 extend through the center of the cap and bushing to a point flush with the lower surface of the bushing. The space between the shafts 12 and 14 is plugged by a plug 126 near the lower end of the shafts. The bushing 124 is provided with an external thread and has threaded thereon a gas collector ring 128, within which there are found the radial passages 130 extending from the periphery of the ring inwardly to a space 132 that communicates with the interior of the shaft 14. The outer ends of passages 130 are slightly more than one half the distance from the axis of the rotor to the periphery of the rotor, i.e. 53% of the radius of the rotor. The inner stream of gas flowing upwardly through the rotor passes through the passages 130 to the space 132 and thence through inner shaft 14 to the upper port section 24 of the machine.

At a point somewhat above the bottom of shafts 12 and 14, the outer shaft 12 is provided with a series of ports 134 that communicate with radial passages 136 extending substantially to the inner surface of wall 110. By means of ports 134 and passages 136, gas flowing downwardly between the shafts 12 and 14 is conducted to the periphery of the rotor and then passes downwardly through the rotor in a thin annular stream at the periphery of the rotor. The end cap at the lower end of rotor 10 is similar in construction to the end cap 112.

Referring again to Figures 1 and 2, the rotor 10 is enclosed in a relatively heavy stationary housing 178. It is usually desirable that the rotor 10 be rotated in a relatively low pressure atmosphere and therefore the housing 178 is made gas tight so that the housing may be evacuated to the desired extent. The housing 178 also acts as a protection in case of mechanical failure of the rotor while it is rotating at high speed.

Below the rotor section 28, there is a lower damper 30 that may be similar in construction to the damper 26 described above and operates in a similar manner to reduce vibration of the rotating parts of the centrifuge. The lower concentric hollow shafts 16 and 18 extend through the lower damper section to the lower port section 32.

The construction of the lower port section 32, which is somewhat similar to the upper port section 24, is best shown in Figure 7 of the drawings. Referring to Figures 2 and 7, a pumping element 138, similar to the pumping element 48, surrounds and is fixed to the lower concentric hollow shafts 16 and 18. The pumping element 138 has an impeller 140 provided with internal radial passages 142. Gas flowing downwardly through the annular space between the shafts 16 and 18 passes through a series of ports 144 to the passages 142 and is pumped by impeller 140 out of the lower port section through conduit 39. The gas that enters the lower port section 32 through conduit 40 flows through ports 146 in element 138 and passages 148 in transposition piece 150 to the inner shaft 18. Downflow of gas in shaft 16 is prevented by the rod 152 which is secured to the lower end of the hollow shaft as shown in Figure 7 and extends downwardly to the thrust bearing 34 at the bottom of the machine. The lower port section 32 may, if desired, be provided with inert gas seals including seal rings similar to the rings 84 to 92 of the upper port section 24.

The manner in which centrifuges of the type described in detail above may be interconnected to form a gas-separating cascade is indicated in Figure 8 of the drawings. It is to be understood that such a gas-separating cascade may comprise a very large number of centrifuges, especially when the cascade is to be used to separate isotopic gaseous mixtures. Thus a cascade for separating the isotopic species of uranium hexafluoride may comprise of the order of 4,000 centrifuges. The centrifuges of the cascade may be interconnected in various ways. Figure 8 represents only a small section of a cascade and is intended to indicate diagrammatically one of the various ways in which countercurrent centrifugal separation may be effected in accordance with the method of the present invention.

Referring to Figure 8, an unseparated or partially separated fraction of the process gas is fed to a header 180 and flows through the intake conduits 182a, 182b, 182c, and 182d to the lower inner shafts of the centrifuges 184a, 184b, 184c, and 184d, respectively. The flow of gas to the individual centrifuges may be controlled by the valves 186a, 186b, 186c, and 186d. The gas flows up through each centrifuge in the manner previously described and as indicated by the arrows of Figure 8 passes through the discharge conduits 188a, 188b, 188c, and 188d to the header 190. A portion of the gas flowing to the header 190 flows continuously through an adjustable restriction 192 to the header 194 and is returned to the centrifuges 184a, 184b, 184c, and 184d through the intake conduits 196a, 196b, 196c, and 196d, respectively. The returned gas flows down through the centrifuges 184 as indicated by the arrows and thence through the discharge conduits 198a, 198b, 198c, and 198d to the header 200. Between the headers 180 and 200 there is a variable restriction 202 which is adjusted to permit a predetermined quantity of gas to flow to the header 200.

It is evident that the centrifuges 184a, 184b, 184c, and 184d are connected in parallel to form a single stage of the cascade and that this stage may comprise many more centrifuges than the four shown in Figure 8. As pointed out above, the nature of a cascade for separating a light fraction of gas from a gaseous mixture is such that the number of separating units decreases from stage to stage and accordingly the second stage, indicated in the upper portion of Figure 8, is represented by only two centrifuges. Gas from the header 190 passes through the intake conduits 204a and 204b to the centrifuges 206a and 206b and thence through the discharge conduits 208a and 208b to the header 210. A portion of the gas reaching the header 210 flows continuously through an adjustable restriction 212, similar to the restrictions 192 and 202, to a header 214 and is returned to the centrifuges 206a and 206b through the intake conduits 216a and 216b, respectively. The returned gas flows through the centrifuges 206a and 206b and then through the discharge conduits 218a and 218b to the header 194. The conduits 188, 196, 198, 204, 208, 216 and 218 are provided with control valves similar to the valves 186 of the conduits 182.

It is to be understood that the cascade may comprise a large number of stages, i.e. the lower stage of Figure 8 comprising the centrifuges 184 may be preceded by numerous other similar stages and the upper stage comprising the centrifuges 206 may be followed by numerous other similar stages. As the countercurrently flowing gas fractions pass through the individual centrifuge units, each inner stream is enriched with respect to the light constituent of the mixture and each outer stream is enriched with respect to the heavy constituent of the mixture. Thus the gas in the header 190 contains a higher concentration of the light constituent than the gas in the header 180 and the gas in the header 210 contains a higher concentration of the light constituent than the gas in the header 190. Similarly the gas in header 200 is more nearly depleted with respect to the light constituent than the gas in header 194, and the gas in header 194 is more nearly depleted with respect to the light constituent than the gas in header 214. Hence, by using a sufficient number of stages substantially pure light component may be withdrawn from the top of the cascade.

The method of the present invention by increasing the effective separation per centrifuge unit makes possible a substantial reduction in the number of centrifuges required in a cascade of a given separating capacity. Thus, for example, in a cascade for separating the isotopic species of uranium hexafluoride the use of the present method makes possible a reduction of approximately 25% in the number of centrifuges required as compared with the number required if conventional flow-through centrifuges are used. Furthermore the countercurrent centrifuges may be arranged in a cascade having a broader base, and hence one that is easier to operate and control.

Since many embodiments of the present invention may be made and since many changes may be made in the embodiments described above, it is to be understood that the foregoing description is to be interpreted as illustrative only and not in a limiting sense.

I claim:

1. The method of separating a fluid mixture of completely miscible relatively heavy and light components into relatively heavy and light fractions by centrifugal force which comprises introducing a first stream of said fluid mixture into one end of a centrifuge rotor, causing said first stream to flow axially through the central portion of said rotor, removing said first stream from the other end of said rotor, introducing a second stream of said fluid mixture into said other end of said rotor, causing said second stream to flow axially through the peripheral portion of said rotor countercurrent to said first stream, removing said second stream from said one end of said rotor, and rotating said rotor to cause said light component to concentrate in said first stream and said heavy component to concentrate in said second stream.

2. The method of separating a fluid mixture of completely miscible relatively heavy and light components into relatively heavy and light fractions by centrifugal force which comprises introducing a stream of said fluid mixture into one end of a centrifuge rotor, causing said stream of fluid to flow axially through the central portion of said rotor, removing said stream of fluid mixture from the other end of said rotor, reintroducing a portion of the stream of removed fluid mixture into said other end of said rotor near the periphery of said rotor, causing said reintroduced fluid mixture to flow axially through the peripheral portion of said rotor, removing reintroduced fluid mixture from said one end of said rotor and rotating said rotor to cause said light component to diffuse from said reintroduced fluid to said stream of fluid and heavy component to diffuse from said stream of fluid to said reintroduced fluid.

3. The method of separating a fluid mixture of completely miscible relatively heavy and light components into relatively heavy and light fractions by centrifugal force which comprises passing a stream of said fluid mixture axially through the central portions of a plurality of centrifuge rotors connected in parallel, reintroducing into each of said rotors a portion of the fluid mixture leaving said rotors, causing said reintroduced fluid to flow through the peripheral portions of said rotors countercurrent to said central stream of fluid, rotating said rotors to cause said light component to concentrate in said central portions of said rotors and said heavy component to concentrate in said peripheral portions of said rotors, and withdrawing from said rotors reintroduced fluid mixture enriched with respect to said heavy component.

4. The method of separating a fluid mixture of completely miscible relatively heavy and light components into relatively heavy and light fractions by centrifugal force which comprises passing a stream of said fluid mixture axially through the central portions of a plurality of centrifuge rotors interconnected in a cascade, reintroducing into each of said rotors a portion of the fluid mixture leaving that rotor, causing said reintroduced fluid to flow through the peripheral portions of said rotors countercurrent to said central stream of fluid, rotating said rotors to cause said light component to concentrate near the centers of said rotors and said heavy component to concentrate near the peripheries of said rotors, supplying said fluid mixture to the base of said cascade, and withdrawing from the top of said cascade fluid mixture that is enriched with respect to said light component.

5. The method of separating a fluid mixture of completely miscible relatively heavy and light components into relatively heavy and light fractions by centrifugal force which comprises continuously passing a first thin, cylindrical stream of said fluid mixture in an axial direction through the central portion of a centrifuge rotor, continuously passing a second thin, cylindrical stream of said fluid mixture through the peripheral portion of said rotor in a direction countercurrent to said first stream, said first and second streams being substantially spaced from one another, and rotating said rotor to cause said light component to diffuse from said second stream to said first stream and said heavy component to diffuse from said first stream to said second stream.

6. The method of separating a fluid mixture of completely miscible relatively heavy and light components into relatively heavy and light fractions by centrifugal force which comprises introducing a first thin, cylindrical stream of said fluid mixture into one end of a centrifuge rotor, causing said first stream to flow axially through said rotor at points approximately midway between the axis and periphery of said rotor, removing said first stream from the other end of said rotor, introducing a second thin, cylindrical stream of said fluid mixture into said other end of said rotor, causing said second cylindrical stream to flow through said rotor near the periphery of said rotor and rotating said rotor to cause said light component to diffuse from said second stream to said first stream and said heavy component from said first stream to said second stream.

7. The method of separating a fluid mixture of completely miscible relatively heavy and light components into relatively heavy and light fractions by centrifugal force which comprises introducing a first thin cylindrical stream of said fluid mixture into one end of a centrifuge rotor, causing said first stream to flow axially through said rotor at a radial distance from the axis of said rotor that is between 40% and 60% of the radial distance between the axis and periphery of said rotor, removing said first stream from the other end of said rotor, introducing a second thin cylindrical stream of said fluid mixture into said other end of said rotor, causing said second cylindrical stream to flow through said rotor near the periphery of said rotor, and rotating said rotor to cause said light component to diffuse from said second stream to said first stream and said heavy component from said first stream to said second stream.

8. The method of separating a fluid mixture of completely miscible relatively heavy and light components into relatively heavy and light fractions by centrifugal force which comprises introducing a first thin cylindrical stream of said fluid mixture into one end of a centrifuge rotor, causing said first stream to flow axially through said rotor at a radial distance from the axis of said rotor that is approximately 53% of the radial distance between the axis and periphery of said rotor, removing said first stream from the other end of said rotor, introducing a second thin cylindrical stream of said fluid mixture into said other end of said rotor, causing said second cylindrical stream to flow through said rotor near the periphery of said rotor, and rotating said rotor to cause said light component to diffuse from said second stream to said first stream and said heavy component from said first stream to said second stream.

9. The method of separating a gas mixture of relatively heavy and light components into relatively heavy and light fractions by centrifugal force which comprises continuously passing a first stream of said gas mixture in an axial direction through the central portion of a centrifuge rotor, continuously passing a second stream of said gas mixture through the peripheral portion of said rotor in a direction countercurrent to said first stream, and rotating said rotor to cause said light component to concentrate in said first stream and said heavy component to concentrate in said second stream.

10. The method of separating a gas mixture of relatively heavy and light components into relatively heavy and light fractions by centrifugal force which comprises introducing a stream of said gas mixture into one end of a centrifuge rotor, causing said stream of gas to flow axially through the central portion of said rotor, removing said stream of gas from the other end of said rotor, reintroducing a portion of the stream of removed gas mixture into said other end of said rotor near the periphery of said rotor, causing said reintroduced gas to flow axially through the peripheral portion of said rotor, rotating said rotor to cause said light component to diffuse toward the center of said rotor and said heavy component to diffuse toward the periphery of said rotor, and removing from said rotor reintroduced gas mixture that has been enriched with respect to said heavy component.

11. The method of separating a gas mixture of relatively heavy and light components into relatively heavy and light fractions by centrifugal force which comprises passing a stream of said gas mixture axially through the central portions of a plurality of centrifuge rotors interconnected in a cascade, reintroducing into each of said rotors a portion of the gas mixture leaving that rotor, causing said reintroduced gas to flow through the peripheral portions of said rotors countercurrent to said central stream of gas, rotating said rotors to cause said light component to concentrate near the centers of said rotors and said heavy component to concentrate near the peripheries of said rotors, supplying said gas mixture to the base of said cascade, and withdrawing from the top of said cascade gas that is enriched with respect to said light component.

12. The method of separating a gas mixture of relatively heavy and light components into relatively heavy and light fractions by centrifugal force which comprises continuously passing a first thin, cylindrical stream of said gas mixture in an axial direction through the central portion of a centrifuge rotor, continuously passing a second thin, cylindrical stream of said gas mixture through the peripheral portion of said rotor in a direction countercurrent to said first stream, said first and second streams being substantially spaced from one another, and rotating said rotor to cause said light component to diffuse from said second stream to said first stream and said heavy component to diffuse from said first stream to said second stream.

13. The method of separating gaseous mixtures of relatively heavy and light components and isotopic gaseous mixtures into relatively heavier and lighter fractions by centrifugal force which comprises introducing mixtures of the gases endwise into a rotating chamber and passing the same countercurrent to each other axially through said chamber in two radially spaced parallel streams, one of said streams being introduced to said chamber at the periphery thereof and the other of said streams being introduced to said chamber a distance radially outward from the rotational axis of the chamber from 40% to 60% of the radial distance from the axis to the periphery of said chamber, subjecting said streams of gases to centrifugal forces during passage thereof through said chamber to separate the same into relatively heavier and lighter fractions thereof, and withdrawing said heavier and lighter fractions of the mixtures endwise at the opposite ends of said chamber, said heavier fraction being withdrawn from the chamber at the periphery thereof and the lighter fraction being withdrawn at a distance radially outward from the rotational axis of the chamber from 40% to 60% of the radial distance from said axis to the periphery of said chamber.

14. The method of separating gaseous mixtures of relatively heavy and light components and isotopic gaseous mixtures into relatively heavier and lighter fractions by centrifugal force, which comprises introducing mixtures of the gases endwise into a rotating chamber and passing the same countercurrent to each other axially through said chamber in two radially spaced parallel streams, one of said streams being introduced into said chamber at the periphery thereof and the other of said streams being introduced into said chamber a distance radially outward from the rotational axis of the chamber about 53% of the radial distance from the axis to the periphery of said chamber, subjecting said streams of gases to centrifugal forces during passage thereof through said chamber to separate the same into relatively heavier and lighter fractions thereof, and withdrawing said heavier and lighter fractions of the mixtures endwise at opposite ends of said chamber, said heavier fraction being withdrawn from the chamber at the periphery thereof and the lighter fraction being withdrawn at a distance radially outward from the rotational axis of the chamber of about 53% of the radial distance from said axis to the periphery of said chamber.

References Cited in the file of this patent

UNITED STATES PATENTS

| | | |
|---|---|---|
| 1,061,656 | Black | May 13, 1913 |
| 1,123,867 | Gue | Jan. 5, 1915 |
| 1,232,104 | Sharples | July 3, 1917 |
| 1,649,118 | Jones | Nov. 15, 1927 |
| 1,700,928 | Fawkes | Feb. 5, 1929 |
| 1,764,390 | Cleary | June 17, 1930 |
| 2,102,525 | Freeman | Dec. 14, 1937 |
| 2,108,098 | Bergner | Feb. 15, 1938 |
| 2,138,467 | Ayres et al. | Nov. 29, 1938 |
| 2,176,982 | Thayer | Oct. 24, 1939 |
| 2,286,157 | Podbielniak | June 9, 1942 |
| 2,291,849 | Tomlinson | Aug. 4, 1942 |

OTHER REFERENCES

German publication: Zeitschrift für Physikalische Chemie, 44 Band (1939), Clusius and Dickel, pages 435 to 437.